Sept. 21, 1943.  K. J. HEINICKE  2,329,897
SUBSTAGE LAMP
Filed Feb. 12, 1942
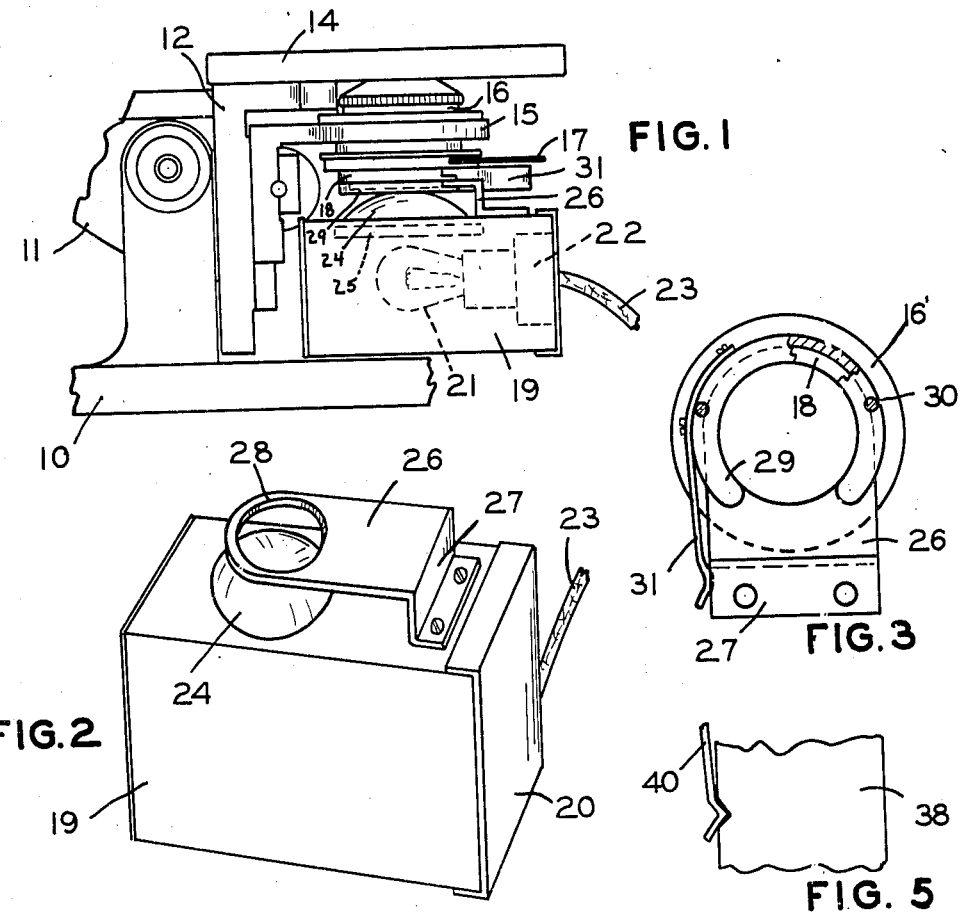
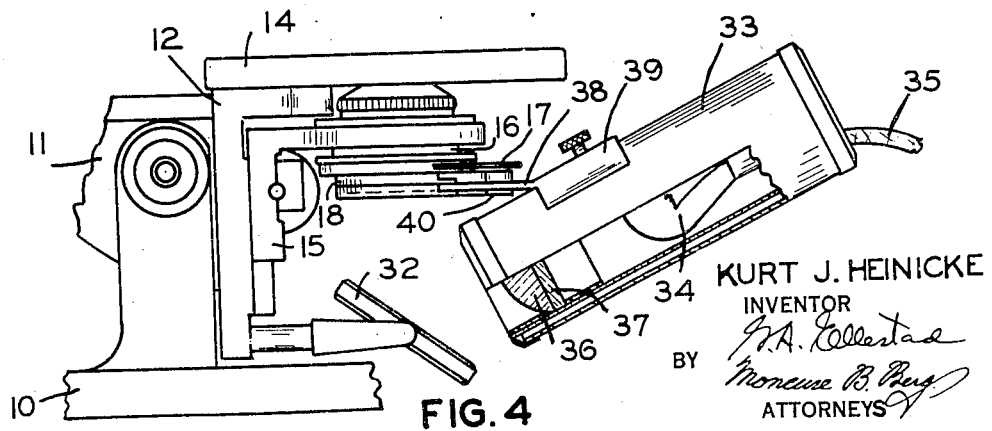
KURT J. HEINICKE
INVENTOR
BY
ATTORNEYS Patented Sept. 21, 1943

2,329,897

UNITED STATES PATENT OFFICE 2,329,897

SUBSTAGE LAMP

Kurt J. Heinicke, Irondequoit, N. Y., assignor to Bausch & Lomb Optical Company, Rochester, N. Y., a corporation of New York Application February 12, 1942, Serial No. 430,663

5 Claims. (Cl. 240—2)

The invention relates to illuminating devices, especially to lamps and the like employed in conjunction with a microscope to illuminate the object being observed.

For the purpose of illumination, microscopists often employ a small and compact lamp which is adapted to be seated on the work table supporting the microscope at a position directly under the stage of the instrument or in front of the instrument and close to the microscope mirror. Practice of this nature presents the difficulty that should either the microscope or the lamp be accidentally or otherwise moved after the lamp has been located in its working position, it becomes necessary to readjust the position of the lamp to again obtain suitable illuminating conditions.

It is an object of the invention to provide an improved illuminating device for use with a microscope, which device is removably carried by the instrument. Another object is to provide a substage lamp and means for supporting the same from the substage of a microscope. A further object of the invention resides in the provision of substage illuminating units and supports therefor which permit a unit to be moved with the substage of a microscope and which allow the unit to be held under the substage condenser or in front of the microscope mirror. These and other objects and advantages reside in certain novel features of construction, arrangement and combination of parts as will hereinafter be more fully described and pointed out in the appended claims.

Referring to the drawing, wherein like reference characters designate similar parts in the different views:

Figure 1 is a partial side elevation of a conventional microscope with which is associated one form of illuminating device.

Figure 2 is a perspective view of the lamp shown in Figure 1.

Figure 3 is a bottom plan view of the substage condenser mount with the supporting means for the lamp of Figure 2 engaged therewith.

Figure 4 is a partial side elevation of a conventional microscope with which is associated a modified form of illuminating device.

Figure 5 is a partial bottom plan view detailing the means for retaining the lamp of Figure 4 in mounted position on the microscope.

In Figure 1, a form of the invention is disclosed in connection with a microscope having the usual base 10 on which is mounted the pivoted arm 11 and stage support 12, which latter carries the stage 14. Stage support 14 has the substage support arm 15 slidably mounted thereon in a well known manner, for vertical adjustment towards and away from the stage. A suitable opening through the support arm 15 permits the usual mount 16 of a conventional substage condenser to be removably supported in the substage support arm 15. The condenser mount 16 carries the usual lenses and an iris diaphragm which latter is not shown but which is actuated by the fingerpiece 17. Attached to the lower end 16' of the condenser mount 16 so as to partially surround the opening therethrough is a guideway 18 which in plan has the shape of an incompleted ring.

Guideway 18 provides the usual accessory slot for holding filters and other equipment used in microscopic analysis. In cross section, guideway 18 has two legs at right angles to each other, the end of one of which is secured to the lower end 16' of the condenser mount 16 by suitable fastening means. As a result, the face of the other leg of the guideway will be substantially parallel to the lower end 16' of the condenser mount. Guideway 18 is positioned so that the broken away section of the ring is located away from the support 12 or on the right of the instrument as viewed in Figure 1.

The lamp of Figures 1 and 2 comprises a rectangular lamp housing 19 having a removable end member 20. A light source is provided by the electric bulb 21 adapted to be engaged in the socket 22 positioned within the lamp housing and secured to the end member 20. Socket 22 is connected by conductors within the cable 23 to a source of electrical energy. One face of housing 19 is provided with an opening through which light is emitted. When desired, a lens 24 may be mounted within the opening in the lamp housing in the manner shown. One suitable form of lens has a ground convex surface and a plane polished surface. The invention also comprehends use of a ground glass plate in place of a lens. The lamp housing 19 is so constructed that a suitable filter 25 may be mounted therein, if desired, at a location between the light source and the opening in the lamp housing.

Means, such as the plate like support member 26, are employed in mounting the lamp housing 19 on the substage assembly. One end 27 of the support member 26 is bent in the shape of an L and is suitably fastened to the face of the lamp housing which is provided with the light emitting opening while the other end of the support member 26 is provided with a cutaway portion 28 which has a diameter or width approximating that of the interior of the condenser mount 16. Support member 26 is positioned on the housing so that its cutaway portion 28 will be aligned with the light emitting opening in the housing and with the lens 24. It may be observed that the end of the support member 26 adjacent the cutaway portion is rounded, the purpose of which will presently appear. By reason of the just described construction, the cutaway portion 28 will lie in a plane which is substantially parallel to and which is separated from the face of the housing 19 to which the support member 26 is attached.

As the lamp housing is adapted to be supported from the substage assembly in a position directly below the condenser, the usual microscope mirror has been removed from the instrument shown in Figure 1. For mounting the lamp housing, use is made of a guideway 29 which is substantially similar in cross section, plan and size to the guideway 18. Screws 30, shown in Figure 3, extend through the guideway 29 to secure it to the guideway 18 so that the face of one of its legs is also substantially parallel to the lower end 16' of the condenser mount 16. Guideway 29 partially surrounds the opening through the condenser mount 16 and like the guideway 18 is oriented so that its broken away section is positioned as far as possible from the stage support 12.

The dimensions of the support member 26 are chosen so that when it is inserted in the guideway 29 it will be frictionally engaged therewith and will have the cutaway portion 28 aligned with the condenser. To prevent accidental displacement of the support member 26 and lamp housing, use is made of retaining means in the form of a resilient clip 31 secured to the guideway 29 in the manner shown in Figure 3. As disclosed in the drawing, the free end of the clip 31 is adapted to engage the outer surface of the bent end 27 of the support member 26.

In operation, the lamp housing 19 is mounted on the microscope by merely inserting the support member 26 into the guideway 29 until the end of the support member which has the cutaway portion 28, bears against that part of the guideway 29 which is opposite the broken away section of the same. Clip 31 will then engage the support member 26 of its own accord to hold the lamp in mounted position. The bulb 21 may then be lighted and the condenser focused in the usual manner, the housing 19 being moved vertically in accordance with the focusing adjustment. Not only is the substage lamp held against accidental displacement but the construction described permits bodily movement of the microscope as well as the tipping of the instrument about the pivot connection with its base 10 without disturbing the working position of the lamp. In addition, by making the lamp housing 19 suitably compact, it may be caused to fit between the feet of the base 10 so that the condenser may be "racked down" to the full extent possible even with the housing 19 in mounted position.

When it is desired to dismount the lamp from the instrument, it is only necessary to hold the clip 31 out of engagement with the support member 26 and withdraw the latter from the guideway 29. An important feature of the invention resides in the fact that each time the lamp is mounted it is necessarily moved into a suitable working position for directing light through the condenser.

In the lamp of Figures 1 and 2 it is impractical to obtain relatively intense illumination without the use of a transformer whereby to permit employment of a bulb which while giving the desired high intensity will not cause the lamp housing 19 to become unbearably heated. A modified form of lamp which is adapted to provide illumination of relatively high intensity without becoming heated to impractical limits and which may be connected directly to a source of electric energy is shown in Figures 4 and 5 in association with a microscope similar to that already described. With reference to Figure 4, it may be noted that the microscope has the usual mirror 32 suitably mounted below the stage and that the instrument is provided with the condenser of Figure 1, the mount of which condenser is equipped with a guideway 29 like that heretofore detailed.

The modified form of the invention comprises a tubular shaped lamp housing 33 within which is removably mounted an electric bulb 34 adapted to be connected through the cable 35 to a source of electricity. Bulb 34 is located at one end of housing 33 while the other end of the housing, which is open, has a lens 36 and filter 37 suitably mounted therein, these optical elements being similar to the elements used with the lamp housing 19.

A modified support member 38, bent at one end and provided with the connection piece 39, is secured to the housing 33 by conventional means such as the screw fastening disclosed. Support member 38 is in the form of a plate and is provided at its end opposite its connection piece 39 with a suitable cutaway portion adapted to be aligned with the condenser lens when the lamp housing is mounted. Retaining means, shown in Figures 4 and 5 in the form of the resilient clip 40 secured to the guideway 29, are adapted to releasably engage with a notch in the edge of the support member 38 for securing the lamp housing to the instrument.

It is to be noted that the body of the support member 38 is angularly disposed with respect to the longitudinal axis of the lamp housing 33. This permits the lamp housing 33 to be held in a position which is inclined towards the mirror 32 so that light emitted from the housing is directed onto the mirror. In operation, the mirror is adjusted so as to reflect light, directed thereon by the substage lamp, into the condenser. It will be obvious in the modified form of the invention that the lens housing 33 will always be mounted in a definite relation to the instrument, that the microscope may be bodily moved or tipped on its pivot without affecting the relative position of the substage lamp to the condenser and that the condenser may be racked down without necessitating removal of the lens housing 33 from its mounted position.

From the foregoing, it will be appreciated that the constructions, employed for the illuminating units herein described, work together to the successful attainment of the aims and objects of the invention and provide substage lamps of a simple and compact character which, by reason of the specific mounting means disclosed, are each adapted to be detachably supported on the substage members of the microscope for movement with the substage assembly.

I claim:

1. The combination with a microscope having a substage arm provided with an opening in alignment with a condenser unit and having a guideway partially surrounding said opening, of a lamp and means for removably securing it to said substage arm whereby to permit light emanating from the lamp to be directed through the opening in the substage arm, said lamp comprising a housing having an opening, a light source in the housing positioned to transmit light through the opening in the housing, and a support member secured to said housing, said support member being slidable in said guideway and being provided with a cutaway portion which is brought into registry with the opening in the substage arm when the lamp is mounted on the microscope.

2. In a microscope having a substage arm provided with an opening in alignment with a condenser unit and a guideway adjacent said opening, the combination of a lamp housing having an opening therein; a lamp carried within said housing; and a support member secured to said housing for suspending said housing under said microscope, said member adapted to be slidably mounted on said guideway and provided at one end with a light passing aperture in alignment with the opening of said housing, the light passing aperture of said member being in registry with the opening through the substage arm of the microscope when said member is mounted in a predetermined position on said guideway.

3. In a microscope having a substage arm provided with an opening in alignment with a condenser unit and a guideway adjacent said opening, the combination of a lamp housing having an opening formed therein; a light source positioned within said housing to emit light through the opening therein; means for removably securing said housing to said guideway, said means comprising a supporting member carried by said housing and adapted to be slidably mounted in said guideway, said supporting member having a light passing aperture therein which is moved into registry with the opening of said arm when the support is mounted in a predetermined position on said guideway, with the sides and an end thereof engaged by said guideway, and holding means for releasably securing said support member in said predetermined position on said guideway.

4. The combination with a microscope having a substage support arm formed with an opening therein in alignment with the condensing unit and a guideway partially surrounding said opening, of a lamp; a housing for said lamp, said housing having a light passing aperture therein whereby light from said lamp passes therethrough; and a strap having one end secured to said housing, the opposite end of said strap adapted to be mounted in said guideway whereby said housing is mounted on said substage support arm for movement therewith, the end of said strap mounted in said guideway having a cut-away portion which is brought into registry with the opening of said substage support arm when said strap is mounted in said guideway.

5. In combination with a microscope having a substage support arm formed with an opening in alignment with condenser lens means and reflecting means carried below the stage, of a lamp housing provided with an opening; a lamp positioned within said housing so as to emit light through said opening; means for removably securing said housing to said arm, said securing means comprising a support member secured to said housing and angularly projecting therefrom, said support member provided with a cut-away portion and being slidable in said guideway and when engaged therein having its cut-away portion aligned with said condenser lens means, said member being so angularly disposed relative to the axis of the housing that the same is inclined toward said reflecting means when the support member is engaged in said guideway.

KURT J. HEINICKE.